US011316817B1

(12) United States Patent
Rao

(10) Patent No.: US 11,316,817 B1
(45) Date of Patent: Apr. 26, 2022

(54) LOCATION STORIES AND GEOFENCE CONTENT

(71) Applicant: Sanjay Kaliputnam Rao, Palo Alto, CA (US)

(72) Inventor: Sanjay Kaliputnam Rao, Palo Alto, CA (US)

( * ) Notice: Subject to any disclaimer, the term of this patent is extended or adjusted under 35 U.S.C. 154(b) by 0 days.

(21) Appl. No.: 16/701,148

(22) Filed: Dec. 2, 2019

Related U.S. Application Data

(63) Continuation of application No. 16/013,120, filed on Jun. 20, 2018, now Pat. No. 10,536,422, which is a continuation of application No. 15/150,399, filed on May 9, 2016, now Pat. No. 10,021,059.

(51) Int. Cl.
| | |
|---|---|
| *H04L 12/58* | (2006.01) |
| *H04L 51/52* | (2022.01) |
| *H04L 51/00* | (2022.01) |
| *H04L 29/06* | (2006.01) |
| *G06F 21/10* | (2013.01) |
| *H04L 51/08* | (2022.01) |
| *G06Q 50/00* | (2012.01) |

(52) U.S. Cl.
CPC ............. *H04L 51/32* (2013.01); *G06F 21/10* (2013.01); *G06Q 50/01* (2013.01); *H04L 51/08* (2013.01); *H04L 51/12* (2013.01); *H04L 51/16* (2013.01); *H04L 63/0428* (2013.01); *H04L 63/102* (2013.01); *G06F 2221/07* (2013.01)

(58) Field of Classification Search
CPC ......... H04L 51/32; H04L 51/08; H04L 51/12; H04L 63/0428; H04L 67/1044; H04L 51/10; H04L 51/16; H04L 63/102; G06F 21/10; G06F 2221/07

See application file for complete search history.

(56) References Cited

U.S. PATENT DOCUMENTS

| | | | |
|---|---|---|---|
| 9,246,708 B2* | 1/2016 | Rao | H04L 67/306 |
| 10,021,059 B1* | 7/2018 | Rao | H04L 51/08 |
| 10,536,422 B1* | 1/2020 | Rao | H04L 51/10 |
| 2011/0066743 A1* | 3/2011 | Hurley | H04W 4/021 709/231 |
| 2011/0161427 A1* | 6/2011 | Fortin | H04L 51/20 709/206 |
| 2012/0046770 A1* | 2/2012 | Becker | H04N 21/41407 700/94 |
| 2014/0006501 A1* | 1/2014 | Li | G06Q 50/01 709/204 |
| 2014/0208231 A1* | 7/2014 | Chung | H04L 67/12 715/753 |

(Continued)

OTHER PUBLICATIONS

Winter, Marcus; "Social Object Labels", 2014, IEEE, pp. 489-494. (Year: 2014).*

*Primary Examiner* — Matthew Smithers

(57) ABSTRACT

Various text or other messages may be overlayed on top of these messages. This processing of selecting different content postings from different channels may be determined by the likes on a posting, an editorial account, a recommendation system, or an automated algorithm that looks for curated postings. These postings may be collated into a story based on time of posting, likes, location, users who posted them, high follower posters, low follower posters and other factors. These can be collated into a story1 and a story 2.

15 Claims, 11 Drawing Sheets

(56) References Cited

U.S. PATENT DOCUMENTS

| | | | |
|---|---|---|---|
| 2014/0222802 A1* | 8/2014 | Yan | G06F 16/248 |
| | | | 707/727 |
| 2014/0316766 A1* | 10/2014 | Bao | G06F 40/56 |
| | | | 704/9 |
| 2014/0365570 A1* | 12/2014 | Peters | G06Q 10/107 |
| | | | 709/204 |
| 2015/0181383 A1* | 6/2015 | Schulz | H04W 4/021 |
| | | | 455/456.3 |
| 2016/0041723 A1* | 2/2016 | Ren | G06F 3/04883 |
| | | | 715/765 |
| 2018/0131870 A1* | 5/2018 | Relf | H04N 1/00156 |

* cited by examiner

LOCATION STORIES AND GEOFENCE CONTENT

CROSS REFERENCE TO RELATED APPLICATIONS

This application is a continuation of U.S. patent application Ser. No. 16/013,120, filed on Jun. 20, 2018, which is a continuation of U.S. patent application Ser. No. 15/150,399, filed on May 9, 2016, now U.S. Pat. No. 10,021,059, issued on Jul. 10, 2018. This application incorporates by reference in its entirety and claims the priority benefit of U.S. patent application Ser. No. 16/013,120 and U.S. patent application Ser. No. 15/150,399.

BACKGROUND

Privacy and security concerns persist in these communications both in personal and enterprise corporate social networking and messaging systems. Further, individuals may often end up publishing repeated information across multiple social networks and multiple group chat threads in order to engage the appropriate audience. Members that overlap across these group chat threads may become overwhelmed as they receive duplicate information from the user across multiple message threads.

Abbreviations and Definitions

SN is a social network.

MD is mobile device and may include tablets, smartphones, cellular devices, laptops, personal computers, cellular telephones, portable handheld devices, and other wireless or non wireless enabled devices. These devices may include wired and wireless capabilities and have various wireless modes of communication including wifi, cellular, Bluetooth, Bluetooth le, zigbee, or other wireless communication protocols and standards.

Cloud: may include one or more servers, containers, virtual machines, processing blocks, computing resources, private resources, public accessible resources, or other machines.

Content unit: may include text, messages, pictures, videos, mixes of pictures and videos, multiple pictures and videos, sequences of content, animation, gifs, web links, files, or visual information.

SUMMARY

The present disclosure teaches a variety of approaches for making social networking systems interoperable with mobile device and real-time messaging systems. The present disclosure teaches interfaces that allow information and feedback to be obtained from participants in a social or private network without repetitive or intrusive messages being sent to all participants. Further the present disclosure enables for #channels to be created dynamically using activity indicators across multiple users, group chats, locations, events and other factors. In some embodiments, content may be capture via mobile devices, wearable devices, smart glasses, and using video, pictures, and multi-media content.

It is an aspect of the present disclosure to enable users to effectively post messages publicly, privately, semi-privately to one or more channels, groups, people, and networks. It is further an aspect of the present disclosure to enable viewing of content efficiently and with proper authorization and with appropriate digital rights management. The viewing of content that is repeated across multiple threads may be collated and represented in different markings colors or synthesized out of channels for example. Obtaining proper authorization of content may be based on passwords, domain confirmation, and user account settings. It may further be enabled based on behavioral activities such as make posts at a certain rate and above a daily or monthly active threshold or within a certain location or making posts of high popularity likability or content or combinations thereof.

It is an aspect of the present disclosure to enable social networking and multimedia based messaging systems for use by laptops, smartphones, tablets, web enabled, HTML5 enabled, mobile app enabled and other communication devices. The social networking messaging systems may allow for text, video, audio, and multimedia to be passed between one device and another. In varying embodiments, the system including a server is enabled to seamless exchange data from various wireless devices using different operating systems especially without traditional wireless carrier based solutions.

The social network may be used as a personal network, employment network, professional network, family network, friends network, interest network, coworker network, location based network or private social network for a company, organization, team, or group. An overall social network may be available which includes sub social networks including those for family, friends, employers, and organizations. Additional subset social networks may be available including a corporation social network, a non-profits social network, a city social network, a neighborhood social network, an ad-hoc social network, a location social network, a time based social network, a concert or event social network, or other platform.

In some embodiments, once multiple message threads are created a user may selectively sharing information with targeted recipients that may be in various different groups or of different connectedness. The present disclosure enables the user to selectively post to multiple channels and groups dynamically and in one single action. A user that wishes to update multiple contacts across groups may post a message to one group but may to post the same message separately to each group separately and repeatedly or otherwise would post it to their user profile. As an example, if a user has a first friend group from college and a second friend group from graduate school, the user may wish to update both groups of their activities at the same time while maintaining the separation of contacts across these two entities. Alternatively, an employee may have a first group for their hierarchical team and a second group for which is a matrix organized team which includes people from other departments. In both these instances, it may not be appropriate to combine both lists into one list. However, a user may desire to send out information to both groups simultaneously such as a sales win and upcoming meeting or press release. In these instances, the user may be able to send out the post to both groups by identifying the groups or channels within a single posting line with command such as post: message #location @collegeFriends, @graduateFriends or post: presentation #allemployees, @salesTeam, @marketingTeam. In one embodiment, the user is enabled to hide the command posting of the element from the post itself. Hence, @collegeFriends would not see that the message has been also posted to @graduateFriends. Each of these groups would may see message @collegeFriends.

Group: It is an aspect of the present disclosure to enable groups that are open and closed in nature to a select group of individuals, bots, or entity accounts. Users may be invited to join a group or be granted access to a group based on a criteria including completing certain tasks or verifying employment, university affiliation or other factors.

Channels: It is an aspect of the disclosure to further allow channels in which posts may be created without requiring a closed form membership link. That is channels may collate various posts across thematic interests, locations, places, users, groups, or sets of groups. Membership to certain channels may be via an authentication mechanism, a company admin, or a group admin. These channels may not require the presence of individual members to be created but instead thematic or other tagged content in the areas. It is an aspect of the disclosure to enable channels to have an on or off archival feature. As an example, a user that was not part of the system initially that wishes to review old information in a channel may be given access to the channel which includes previous and archived messages from earlier conversations. A channel may be created by the system and comprise of one or more individuals, users, places, objects, or other accounts and allow for a conversation thread or central repository of all items associated with the channel. Channels may be identified with a unique identifier and a public identifier with a prefix such as an hashtag # symbol or a #CH:<name> symbol for example.

It is an aspect of the present disclosure to enable channels and group messages to be encrypted, password protected, geofenced, and securitized with one or more digital rights management systems. As an example, a channel may be set to be accessible only with a home environment, office environment, university environment, or conference hall. That is full stories, conversations, group chats, and channels may be geofenced. In addition, transport (TCP) and internet protocol (IP) and other networking aspects may be incorporated so as to assess whether a user is connected and should be allowed to access a group chat or a channel or direct message. For example, a user that is connected to a coffee shop wifi network may be allowed to access the group chat or online review board for the coffee shop. A user that is connected to an enterprise wifi network and/or within a GPS or other location that is associated with the office may be able to post and/or review comments.

It is an aspect of the present disclosure to enable the system or users to personalize posts within channels and groups to make custom playlists of content. For example, a user may specify the time or content and see a set of quick clips. A user which seems to receive national news may see the top 5 60 second clips from various news programs. A user that wants to see different perspectives may see a channel with a time duration of the first 5 minutes of various news networks creating a short series of news. Each news network or content provider may subscribe to the social networking channel to provide short clips of content.

The present disclosure enables ad-hoc popup social channels to be created based on trending topics and semantic analysis. As an example, if several users are posting messages, pictures, and videos across various groups, a super channel and a super group or virtual channel may be dynamically created so as to collate and curate top content from the various networks into channel. The channel may have a specified time to live associated with it or a location or other entry criteria to join the channel. Various channels may be created including for example: Top posts in the last 24 hours (ex. #trending24); local_coffee_shop channel (ex: #coffee_shop_523); shopping channel (ex: #brandAchannel); and so forth. The platform may dynamically create #channels for example by looking at overlapping posts across multiple groups. As an example, if several posts about a news topic occur in a first group and several posts around the same topic occur in a second group a new channel or a set of posts from those two groups may be published into a separate channel. In certain instances, it may be less desirable to have content shared from private group chats into more public channels. In these instances, the channels may be created with hashtag indicators to facilitate individuals to include the hashtag in their responses. Alternatively, a digest of trending topics may appear in the channel, such as now trending: "5000+ people are discussing the election primaries." The channel creation may be done via a management tool for creating channels or via a decision engine implementation.

The present disclosure enables for channels to be created such that a user can post a content unit to all, some, private, or public channels at the same or different times. For example, a picture may be flagged to be shared with all channels such as the family channel, group1 channel, group 2 channel, and a direct message to an individual. In each of these areas, the message may be appear to be unique to that group. Alternatively, if the user has already seen the content unit in a different channel then it may be hidden or collapsed. Or the content unit may appear as a direct one to one message communication when in fact it is sent to multiple participants. In various instances, if the message or content has already been read in a different channel or group it may be minimized, filtered out, set in a different color or indicator to show have the content focused on new postings that are original for the viewer.

It is an aspect of the present disclosure to enable dynamic ad insertion into group messages based on the click-thru rates of other participants on the chat. As an example, if an advertisement for one thread is viewed by a first set of people and is seen as not effective, the second advertisement viewed by a second set of people for the same group chat may be altered. Alternatively, a/b testing capabilities of ads may be done with different members of a group chat or varying channels

BRIEF DESCRIPTION OF SEVERAL VIEWS OF THE DRAWING

The accompanying drawings, being incorporated in and forming a part of this specification, illustrate embodiments of the disclosure and, together with the description, serve to explain the principles of the present disclosure.

DETAILED DESCRIPTION

Figure 1:
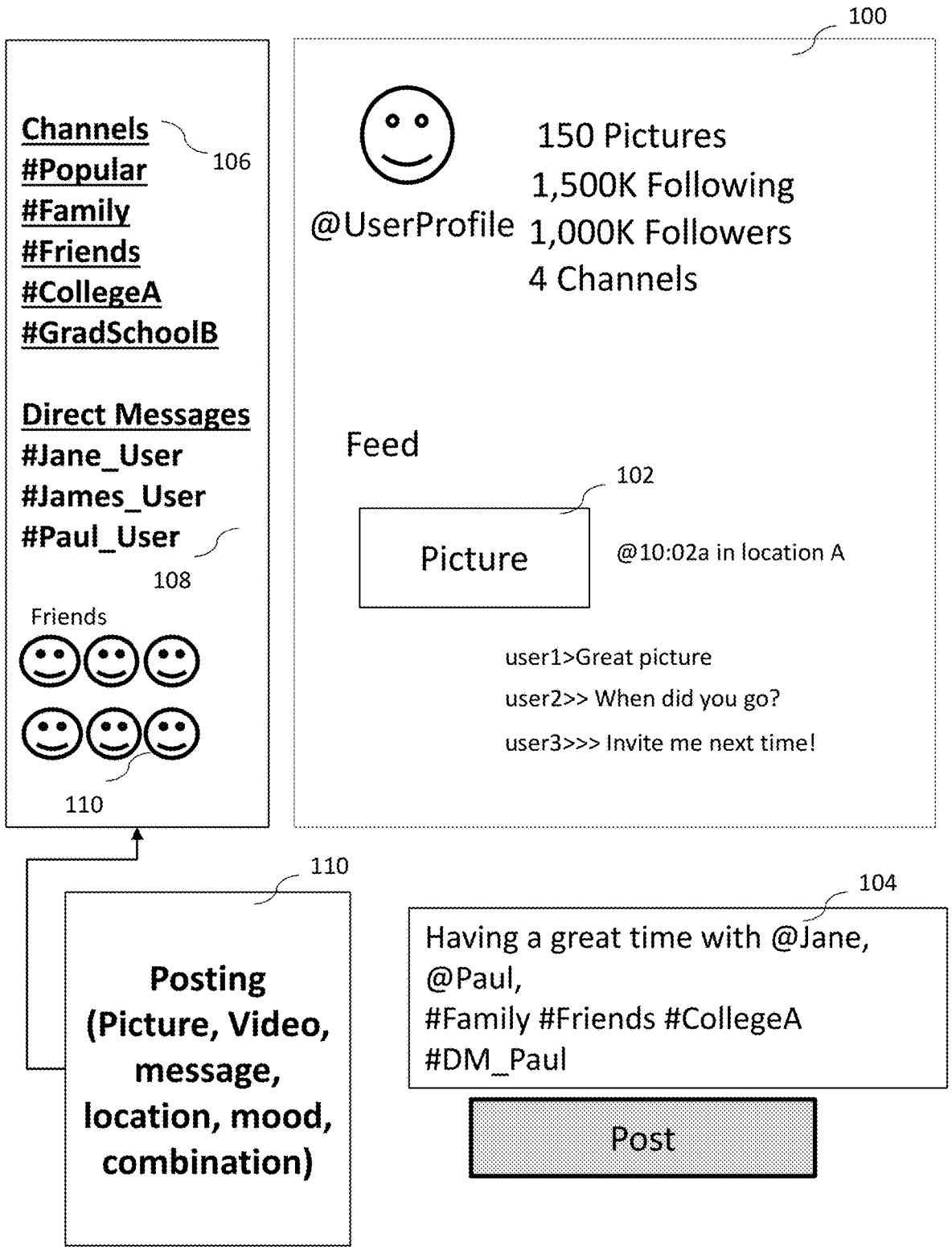
FIG. 1 depicts a user profile posting a content unit to multiple networks at a single time using one post button.

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to those embodiments. On the contrary, the disclosure is intended to cover alternatives, modifications and equivalents, which may be included within the spirit and scope of the disclosure as defined by the appended claims.

It is an aspect of the present disclosure to enable notifications to be sent via email, text, SMS, calls, popups on one or more mobile applications, or other methods based on activity on the app including user invitations, user requests, events, or other items.

In some embodiments, the system may reduce tension on group chat threads between content creators (those that post) and content consumers on group messaging threads. For example, when only a few individuals end up as content creators while others actively consume but rarely create content or are overwhelmed by the high number of messages, a lack of engagement on a group message thread may result. The system may flag and identify threads wherein there are asymmetric relationships on group chat systems or lower participation rates and endless long group messages.

The present disclosure enables individuals to effectively message and communicate across different networks groups and people in a seamless manner such that communication can be private, semi-private, public, ephemeral, hierarchical, or sequential.

It is an aspect of the present disclosure to enable social networking, wifi-based calling, group calling, chats, messaging, interaction with bots, and other features within one or more mobile applications in conjunction with a server or multiple communication devices.

The social network itself may be enabled to offer promotions and discounts to users that post or to incentivize the users to post frequently to various channels. As an example a breaking news channel (#breakingNews) may be created with fully user generated clips from an event as it unfolds. The individuals that post on this channel with clips may compensated for their posts or gain access to ad free usage of the social networking application or may receive discounts and coupons.

In various embodiments, the social networking and messaging platform may include various forms of communication including SMS, text, messages, photo, video, wifi-based calling, phone calling, SIP calling, and session initiation to landline calls.

In one embodiment, a group chat or messaging thread between on or more parties is processed by a software module which in turn is executed by a processor on a server, mobile device, content delivery network, or combinations thereof.

It is an aspect of the disclosure to enable criteria and threshold settings may be specified to joining a channel such as responding to a challenge of providing a photo to a group chat within a set specified period of time.

It is an aspect of the present disclosure to enable end to end encryption wherein message content may be sent peer to peer or via a server wherein the message is deleted from the server within a time period or after confirmation of delivery and download by receiving devices or end points. It is an aspect of the disclosure to enable highlighting or hiding certain previously viewed material across channels.

It is an aspect of the disclosure to enable intelligent caching and storing in memory single copies of content across channels.

It is an aspect of the disclosure to enable setting time to live for channels and self destruction of messages, content units, groups, and private networks.

It is an aspect of the disclosure to enable intelligently posting via a single click to multiple private semi-private or public channels.

It is an aspect of the disclosure to enable geofencing or adding gps or wifi based on other location based zones for content to be stored and held and channels or group chats or content units to be associated and viewable only within the location.

It is an aspect of the disclosure to enable a dynamic channel, group, or message creation based on matched interests and likes of one or more users, companies, and brands.

It is an aspect of the disclosure to enable ad networks and advertising in line in message threads based on the activity of the thread, context of the thread, word choice within the thread, users of the thread, time of day of the thread. Further, ad networks may bid interactively on a particular set of users message threads to insert ads inline with the messages.

It is an aspect of the present disclosure to enable ranking threads based on the interactivity of the message threads including the people responding, the rate of responses, the time of day of responses, whether the responses occur during working or non working hours or social hours. As an example, if the rate of a thread, chat, group, or channel suddenly increases, the posts within this message may be flagged for a curator or published in a trending feed.

It is an aspect of the present disclosure to enable the user to post to multiple channels using a single command like such as "My powerpoint presentation #filestorage:filename #marketingchannel #markComm @productmarketingGroup @jane @jill." Various identifiers here may include hashtags #, at symbols @ or other emojis or symbols to represent people, places, objects, brands, groups, or interest areas. Users may be invited via email, text, SMS, notifications, in-application messaging, voice call, or other means to join one or more groups, channels, or message threads.

It is an aspect of the present disclosure to enable creating a visual representation of channel activity according to one or more graphical bars and colors. The visual representation may enable users to determine a heatmap of interesting topics within one or more channels and determine which channel or group to join. Trending topics may further be determined using the heatmap system.

Referring now to FIG. 1, FIG. 1 exhibits an online website or a view of a mobile application which shows a user profile 100 and various content pieces that appear in a feed 102. The user may also explore various channels 106 which in turn are comprised of content and messages posted to specific groups or networks. Certain channels may be curated by the platform itself or have requirements to join the channel. As an example, an editor may see the most liked images across all threads and be able to approve the content units into a featured or trending thread. Private messages 108 may also be sent and these feeds may appear on the platform site. In one embodiment of the present disclosure a single post 104 with a single button or click may enable a content unit 110 to be sent to multiple channels, networks, and groups and users. In various instances, the channels may be thematic such as a focus on a specific topic and be available to all members within an organization. In other instances, the channel may take the format of a group and be limited to only those individuals. For example, a family channel may be present for one user but a second user may have a completely different family channel. The channels may be dynamically created based on the activities of one or more users on the platform. The user may be invited to create various lists for their contacts such as local_friends, close_friends, intimate_friends, and the like.

Dynamic Channel Creation. It is an aspect of the present disclosure to dynamically create channels based on messages from one or more groups or individuals. Users may be enabled to create rich user profiles including their interest, work experience, colleges, education, friends, interests, likes and other profile elements. Additionally, a user's behavioral data may also be used on the platform. This data may be matched between various users on the platform to generate custom channels and group topics between individuals. As an example, when a new user joins a company or community, a new interest channel may be generated which includes the shared college or sports or events that the two have in common.

In another instance, the channels may be a hybrid of multiple groups that the user is a member of may be inherited from one group to one channel in various instances. For example, if a user is part of a group called @pre-sales and a channel called #go-to-market, certain posts to @pre-sales and from the channel #go-to-market may end up in #marketing channel. Alternatively, an inheritance mechanism may be present to allow for posts from the #marketing channel to be inherited by the #go-to-market channel. Further a mechanism or setting may be specified to allow all posts from a user in the @pre-sales group to enable those to appear in the #marketing channel. As an example, an announcement of a new product announcement may hit the #marketingchannel and automatically appear in the @go-to-market group. Alternatively, a press release advanced by the #go-to-market channel may be automatically posted in the #marketing channel.

A user invitation module and channel development model may present users with requests to select contacts from the user's phone book or recent conversations to create intimate or appropriate targeted and personalized groups and channels 110. The on-boarding process itself may involve requesting individuals to select their most closest friends across a few select interest areas to create custom groups for the individuals. In various instances, in the current embodiment, the user's postings may not require to be published directly just to the user's feed. In various instances, a user's feed on their profile page may be customized based on a permission setting and authentication setting associated with that user and the relevant viewer.

Figure 2:
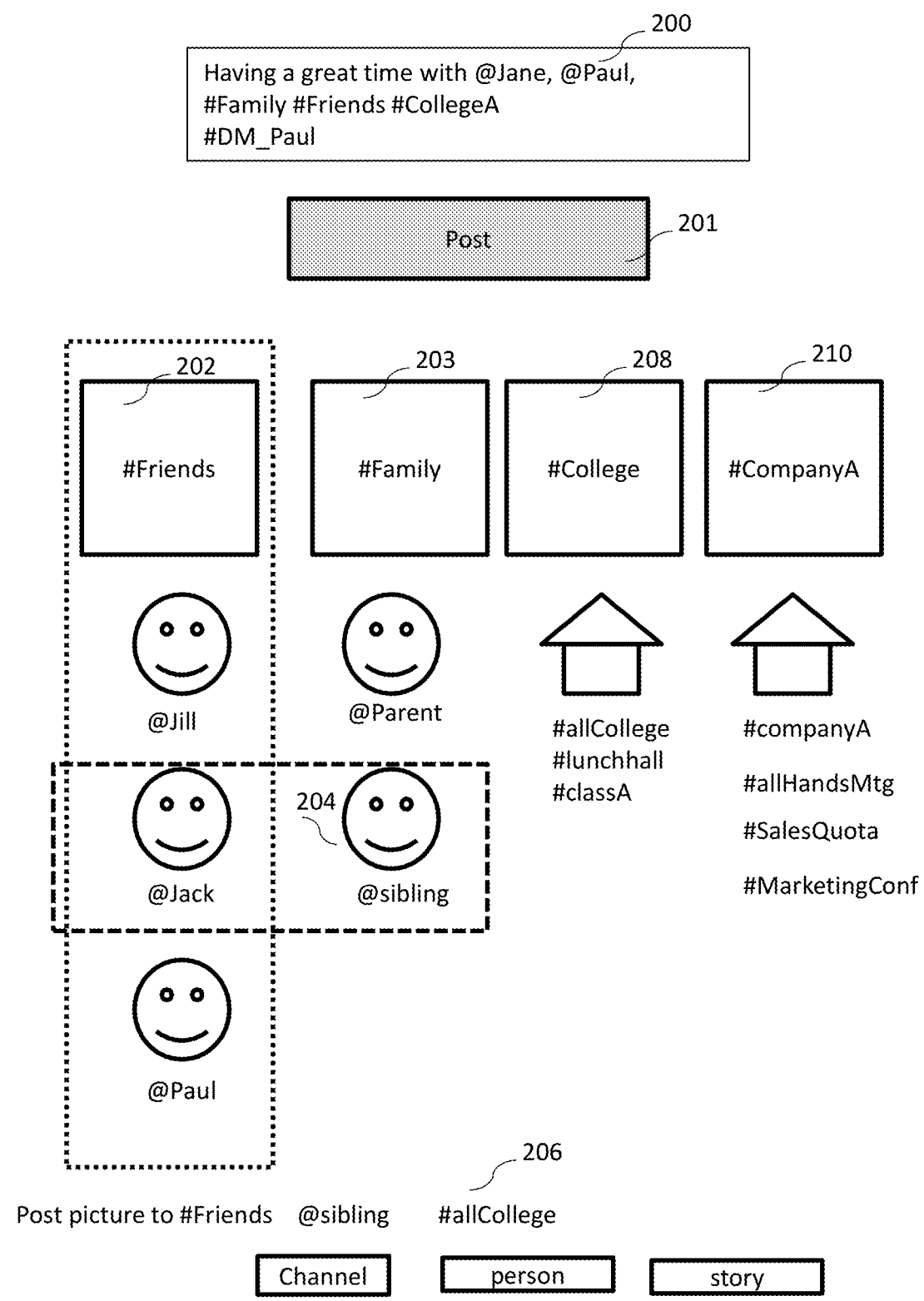
FIG. 2 depicts a posting of content to multiple social networks and social feeds based on custom hashtags.

Referring now to FIG. 2, FIG. 2 depicts a post 200 deployed to multiple channels and networks and members using a hierarchical, individualized, vertical 202, horizontal 204 and mix 202, 204 of all approaches and with a single action press or process 201. The command as to how to post the content unit 206 may be a saved pre-defined default or customized by the user. An entity such as an @organization, company, university, familyA may be created. Responsive to this entity being created, the entity may inherit various public and private channels. These channels may have thematic names such as #nightlife, #dinnerMenuPictures, #politics, #conferenceroomdiscussions, #cablenewsnetworkcontent. These channels may display programmatic content from professional sources. They may also display content from the users on the platform and in the entity. For example, the channels may include all the posts from a user wherein the channel was tagged as #nightlife and #dinnerMenuPictures. In this case, certain content may appear twice in intelligent assistant or both #nightlife and in #dinnerMenuPictures. In other embodiments, a channel may include all content marked public by a user that is also tagged with the university. These postings may then filter into the university channel. As an example, a user may post a comment to a set of friends as part of a @group1. This posting may be marked to a channel or public. In this instance, the content may then appear in the college channel of that user.

Still referring now to FIG. 2, various channels and systems may be setup for friends, 202, family 203, college 208, or companies 210. Various sub channels and groups may be within the college such as a lunchhall thread, classA thread, allCollege thread or channel. Similarly, a company may be enabled with a plurality of channels, groups, or feeds including the entire company, all hands meetings, saleswins and sales quota accounts, and marketing conferences.

Figure 3:
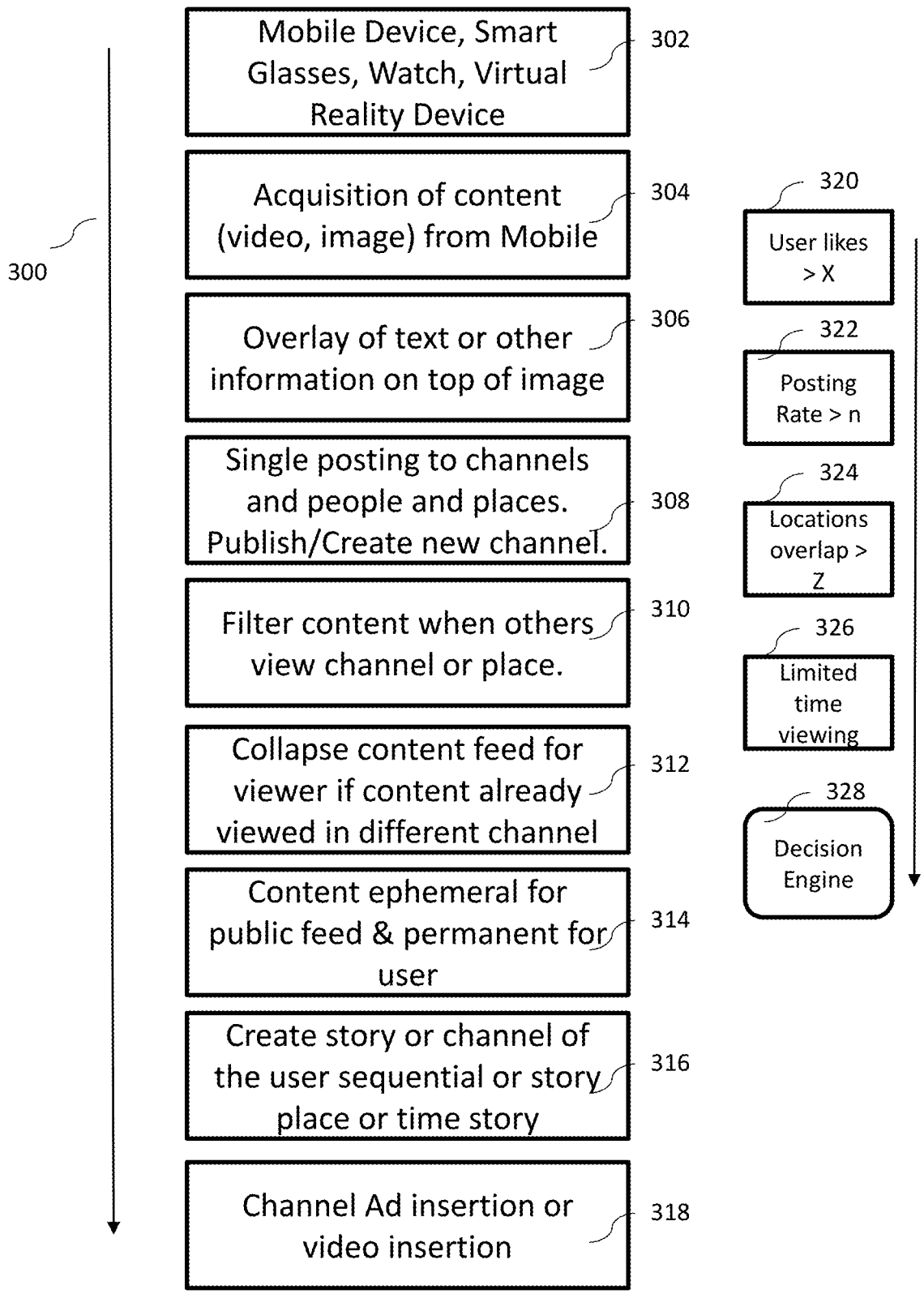
FIG. 3 depicts a workflow of content creation and content consumption to channels such that repeated viewing of content is minimized across channels and users.

Referring now to FIG. 3, FIG. 3 depicts a flow 300 of content creation and consumption by various parties using public and private capabilities. Content creation may be done on a plurality of communication devices using one or more cameras on the device or touch based systems on the device 302. The acquisition of the content 304 may comprise of one or more content formats and be assembled into a sequence, collage, or set as a content unit 304. In turn a user of a mobile application may add overlay text on top of the content item such as the image 306 or the system, server, or other intelligent agent may add information on top of the image to provide further context or detail 306. Images may be analyzed by a recognition system to pinpoint interesting items on the image such as objects brands or other items 306. The system or user may set up rules to automatically post the content to various social networks, groups, channels, or to users 308. As an example, the server may create a new channel when the posting of by members across group chats or by users with certain words exceeds a threshold, rises by a certain percent within a time period, or is coupled to an event or other activity or those pictures which have received a significant number of likes or ratings.

Still referring to FIG. 3, users who view a feed on a channel or direct message may receive customized feeds based in part on the images and content posted to the feed and if they have viewed the content elsewhere. As an example, a user A who posts an image to a #friends channel and a #work_MyCompany channel may have friends who are social and who are coworkers. Therefore the userB who is in this set of friends and coworkers may repeatedly see the same content unit. In order to minimize this content consumption, the content unit may be hidden or collapsed from a message feed with a plus sign + or other identifier 312. Meanwhile the content may be posted in a story 316 format which aggregates multiple content pieces in a sequential manner for the user, such as their activities over the past 24 hours, or content that was posted to a specific place such as work or a museum over the past 24 hours. These stories may have various levels of privacy associated with them and time to live. In various instances, the channels may be supplemented with third party content 318 such as stories, news articles, videos, and advertisements.

Still referring to FIG. 3, FIG. 3 further depicts a decision engine for post curation and channel creation 328. The decision engine may be implemented in instructions and stored in memory for execution by one or more processors on a server or other cloud device. As an example, a channel may be created or a post may be curated or flagged for publication in a channel when the number of likes of the post or image or video exceeds a threshold 320, when the posting rate of similar topics exceeds a threshold or rate 322, when multiple users on the social networking platform are in the same location or move to a new location 324, or when various posts include a time based component such as viewable for 30 s or clips in length of 45 s 326. As an example, if multiple users attended a corporate meeting or a conference, a channel may created or the platform may dynamically create a channel for each room session or conference. The platform may recognize user movements to a new room and examine the posts that individuals are making such as "this is an information session with respect to topic x." The decision engine may set privacy controls or time to lives for channels with archival or non archival or save features. A #trendingchannelinZipCode may dynamically be created when there is a neighborhood party for example and this channel may have a longer archival of posts of several weeks versus a #CorporateWeeklyStatus which may have only a weekly archival setting.

Figure 4:
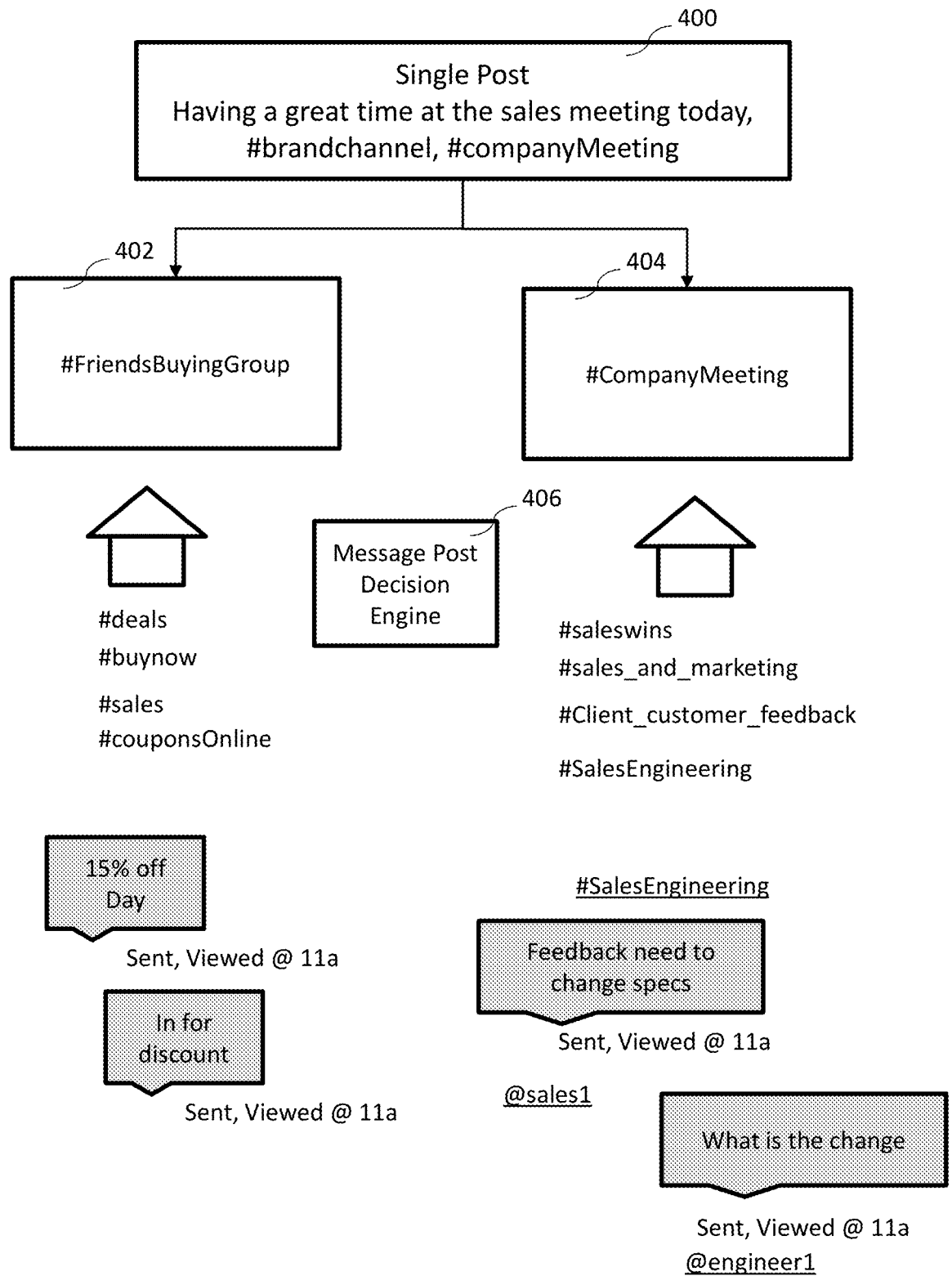
FIG. 4 depicts a single post of a user being automatically published to multiples channels and networks.

Referring now to FIG. 4, FIG. 4 depicts a single post from a first user being published to two channels #FriendsBuyingGroup and #CompanyMeeting 402, 404. The same post may from a first user may end up in two threads simultaneously. The message may be relevant to both threads but have a different context behind each thread. A message post engine module 406 may further also automatically take a posting for the channel 404 and insert the post into channel 402 if there is overlapping context. The message post decision engine may use a plurality of inputs including natural language processing of the threads, context of the post, context of the thread, time, location, and other factors to insert a post from the user 400 into the various channels 402, 404.

Figure 5:
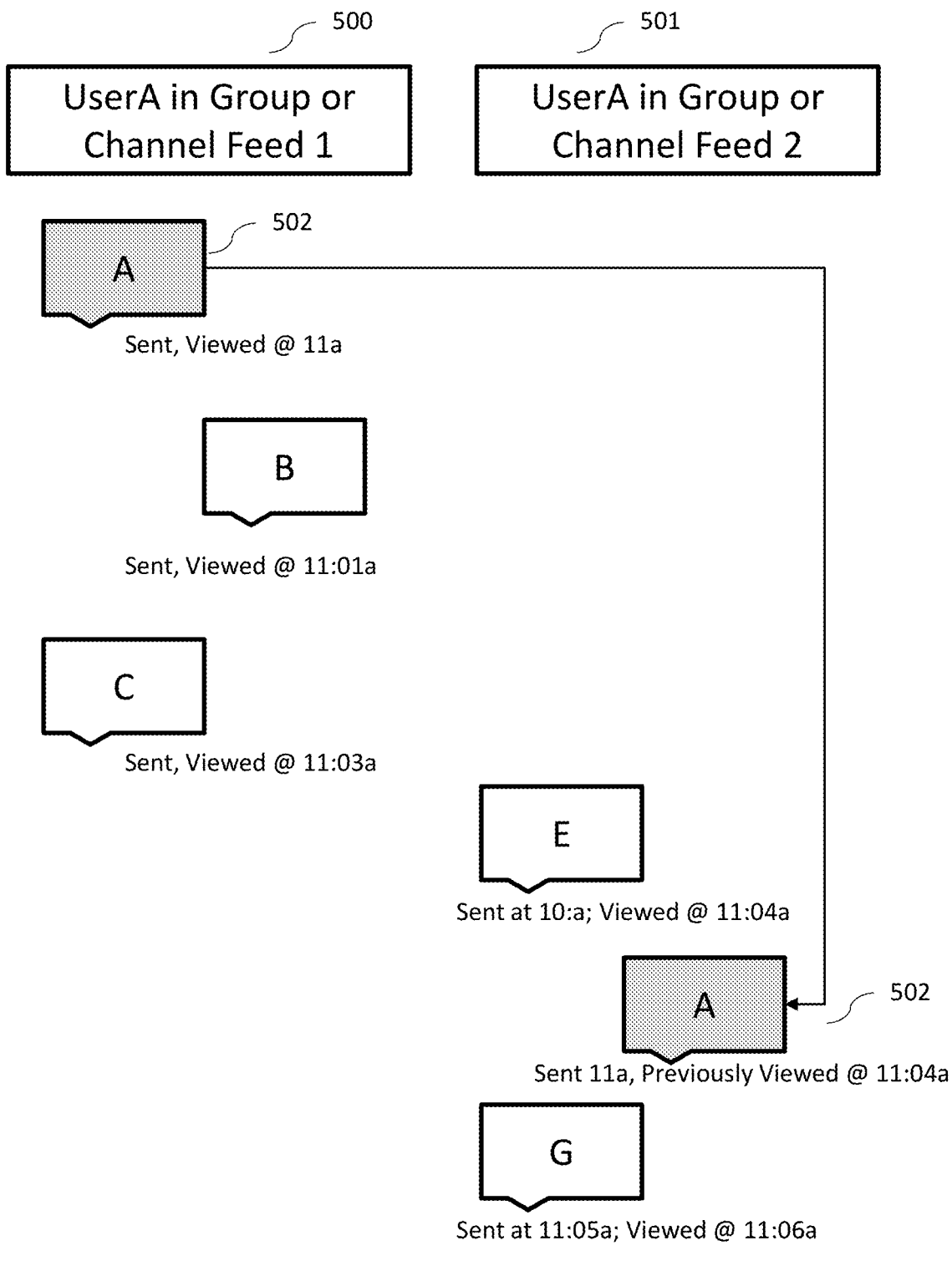
FIG. 5 depicts a message that has been posted to multiple groups.

Referring now to FIG. 5, FIG. 5 depicts a message thread in two groups or channels in which at least one message is overlapping across 500 and 501. Given that the user may have overlapping contacts in one or more channels, a message or image or video or content item 502 may appear in the two channels or groups 500 and 501. The mobile device application or web interface may color the message if previous viewed in a different channel or thread 502. Similarly in a swipe right conversation, this image may be skipped in this channel. This may enable for the conversation threads to move effect effectively.

The system is enabled to appropriately classify a post from a user1 to be broadcast into one or more channels and one or more groups based on the type of post, user, context, and person. A synchronization module may be present at the server and one or more communication devices or mobile devices.

The synchronization of various channels and groups and threads may enable the mobile device to reduce the number of content units including pictures, videos, messages, audio files and other items that it should download across devices. These may occur at a different layer than simply caching the objects especially since the name of said objects across threads may be different.

Figure 6:
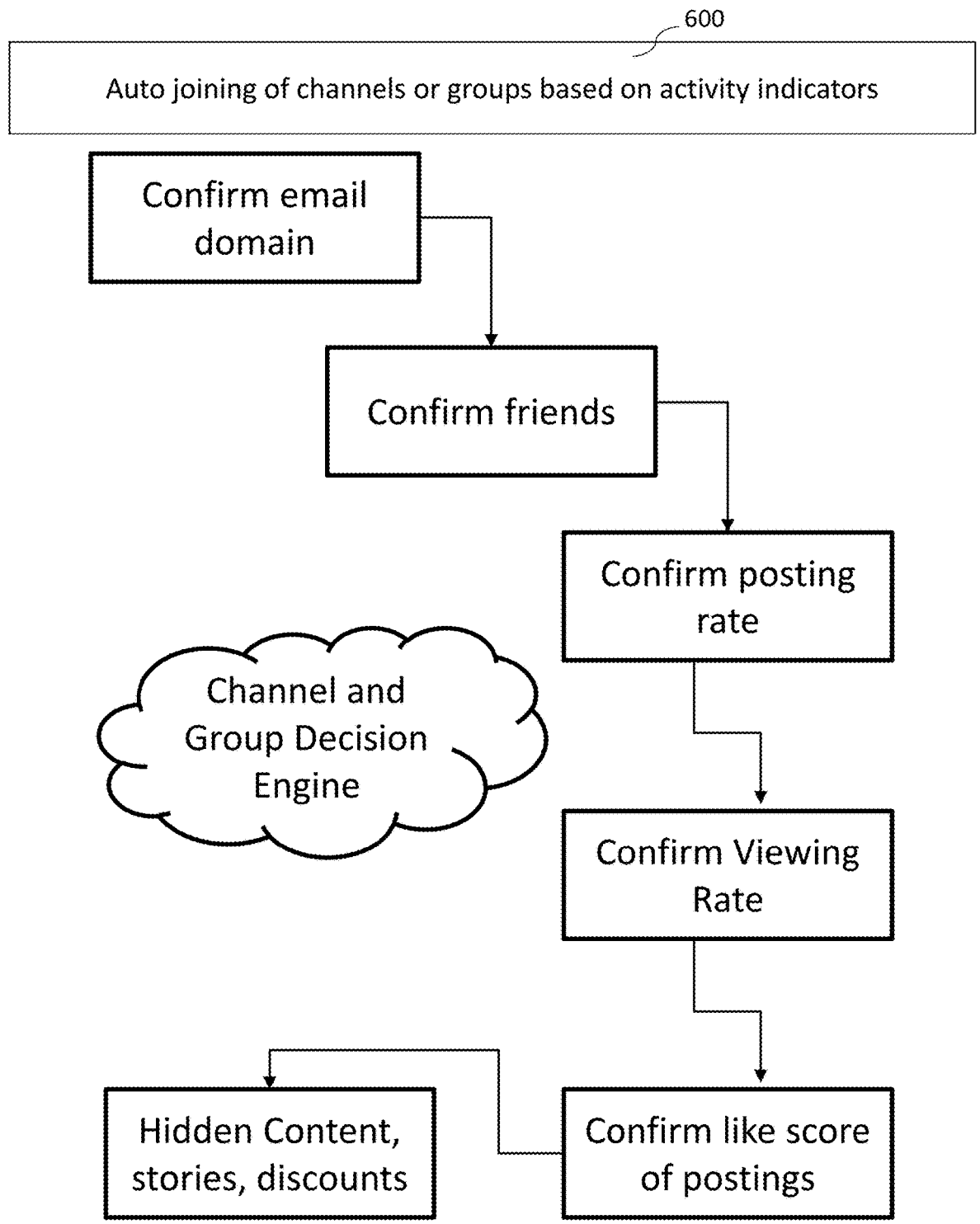
FIG. 6 depicts methods for user access to various channels and groups.

Referring now to FIG. 6, FIG. 6 depicts a sequence of actions taken by a user or group of users to obtain access to a channel or set of channels or groups. A group may automatically gain access to the group 600 by undertaking on or more public or hidden actions. These actions may include confirming an email address, adding friends, posting in a thread at a certain rate, viewing and liking a set of media content, and participating in various advertising activities.

Figure 7:
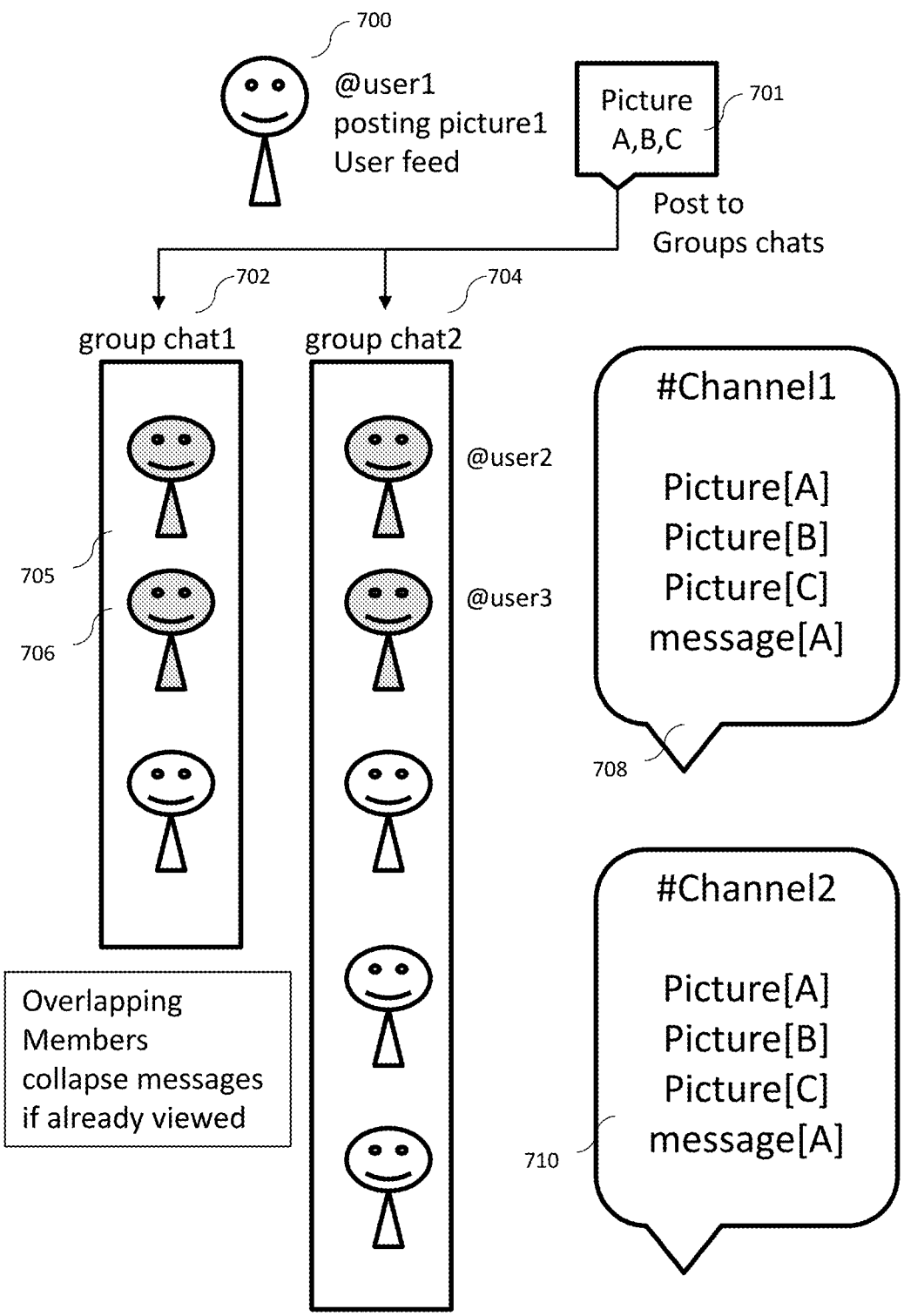
FIG. 7 shows a content efficient publishing and viewing system across multiple channels.

Referring now to FIG. 7, FIG. 7 depicts an efficient memory allocation, publishing and consumption system for multiples users. For example, a user1 700 may be part of two group chat messages one of which includes 3 members and a second chat which includes 5 members. Two members 705, 706 may overlap between the group, called for purposes of illustration user2 and user3, the user may which to send a picture to both threads and as a result must publish this message to both message threads resulting in two postings. Users-2 and User-3 that are in both chat messages may also suffer from information overload as the user-1 messages and pictures appear both threads. Instead of the infrastructure that serves this content similarly be overworked as it must send cache store and process two pictures or videos across these two channels, the posting is identified to be the same across the threads and only one copy is stored on the server, mobile device, and in the various recipients message threads. The image may be sent to a feed in a channel including a first channel 708 and a second channel 710. The pictureA 701 may appear in both channels 708 and 710 without the user having to post the message to both channels separately. In these instances, the pictureA may be posted once, with a default setting or message specific setting stating how to publish the item.

Figure 8:
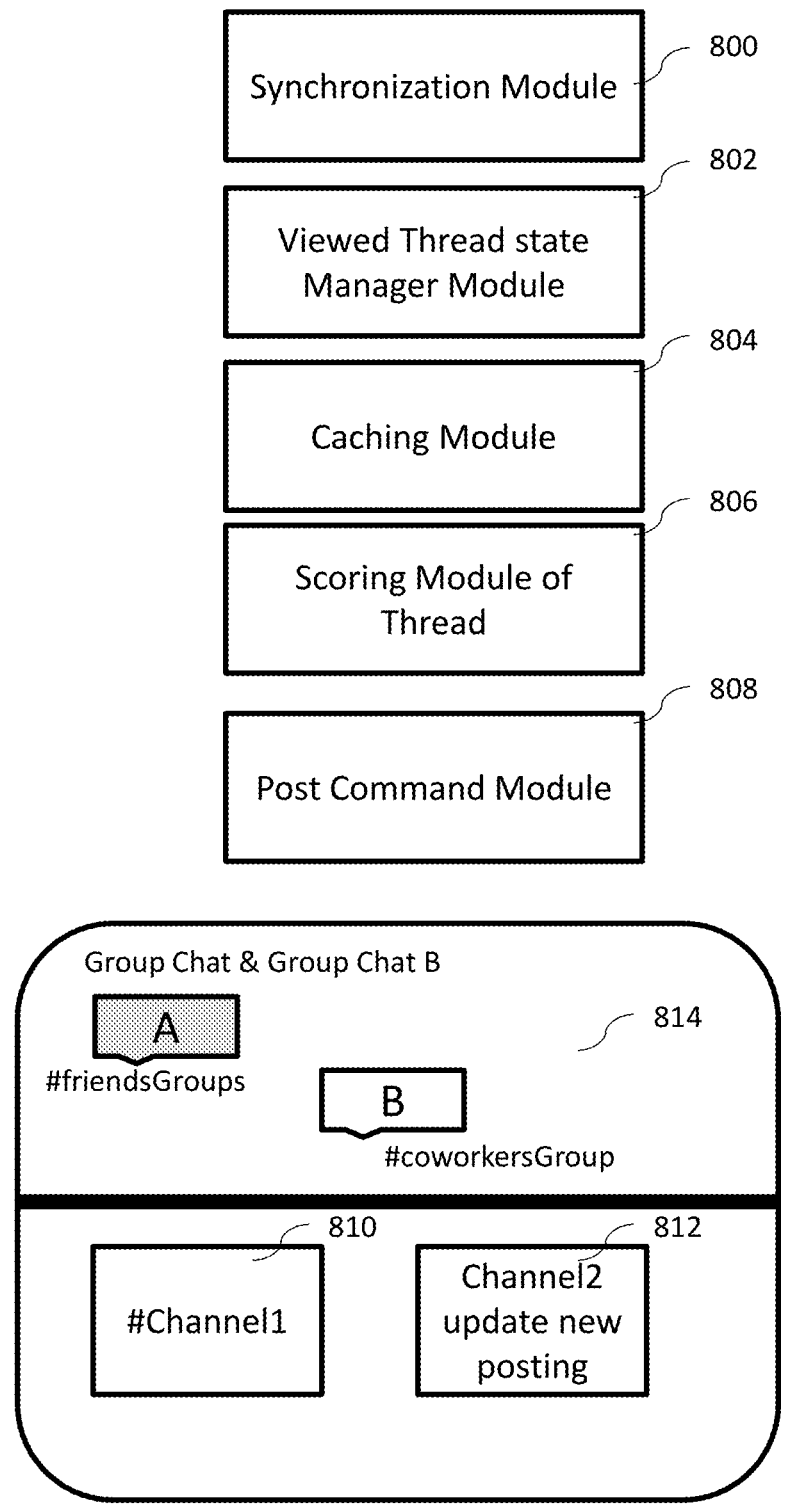
FIG. 8 depicts various modules of the platform.

Referring now to FIG. 8, FIG. 8 depicts various modules. The synchronization module 1100 may pre-fetch in advance using a predictive model or download a smaller version of a file or content unit if that item has already been seen or downloaded by a user in a different channel or thread or if the thread is highly active. Various modules may manage the state of the users 802, analyzing the viewed state of the various threads and messages 802, groups module manager 804 or a channel module manager 806. A synchronization module 800 may manage content across various channels. A thread manager module may be enabled to track a user viewing a content item and feeding data to caching system 804. The caching module 804 may be enabled to predictively cache data on various content delivery networks if the group users have not seen the content. Alternatively, if a user has already seen the content the user may be enabled to skip the content in a second messaging thread. A scoring module 806 may rate threads across various criteria including frequency of postings, users on the thread, language ratings of the thread, closeness of individuals on the thread, and other factors. The post command module 808 is enabled to make private the posted command such that certain channels are not notified of the other private networks, private groups, or private channels that the user is actively posting content on.

Still referring to FIG. 8, a mobile device application may display multiple social network and chat conversations simultaneously. Chat windows may be organized wherein an active chat session occurs on a top part of the display and the bottom half of the display is reserved for other channels and navigation features 810. Notifications and updates to the channel may occur in on or more regions 812. A merge setting may merge content from all chats into one unified chat system with conversations postings including media content in one color for a first channel or group and conversations postings including media content in a second color 814.

In yet another embodiment, an individual may be enabled to set a sequence for a set of photos coupled with a location. As an example, an individual may be able to activate a channel or a group by visiting a specific location. For example, a visit to central park may automatically activate the #centralpark channel. Similarly, a visit to a location may allow a user to access photos, events, tickets, users nearby, and others who have been to the location in the past.

Figure 9:
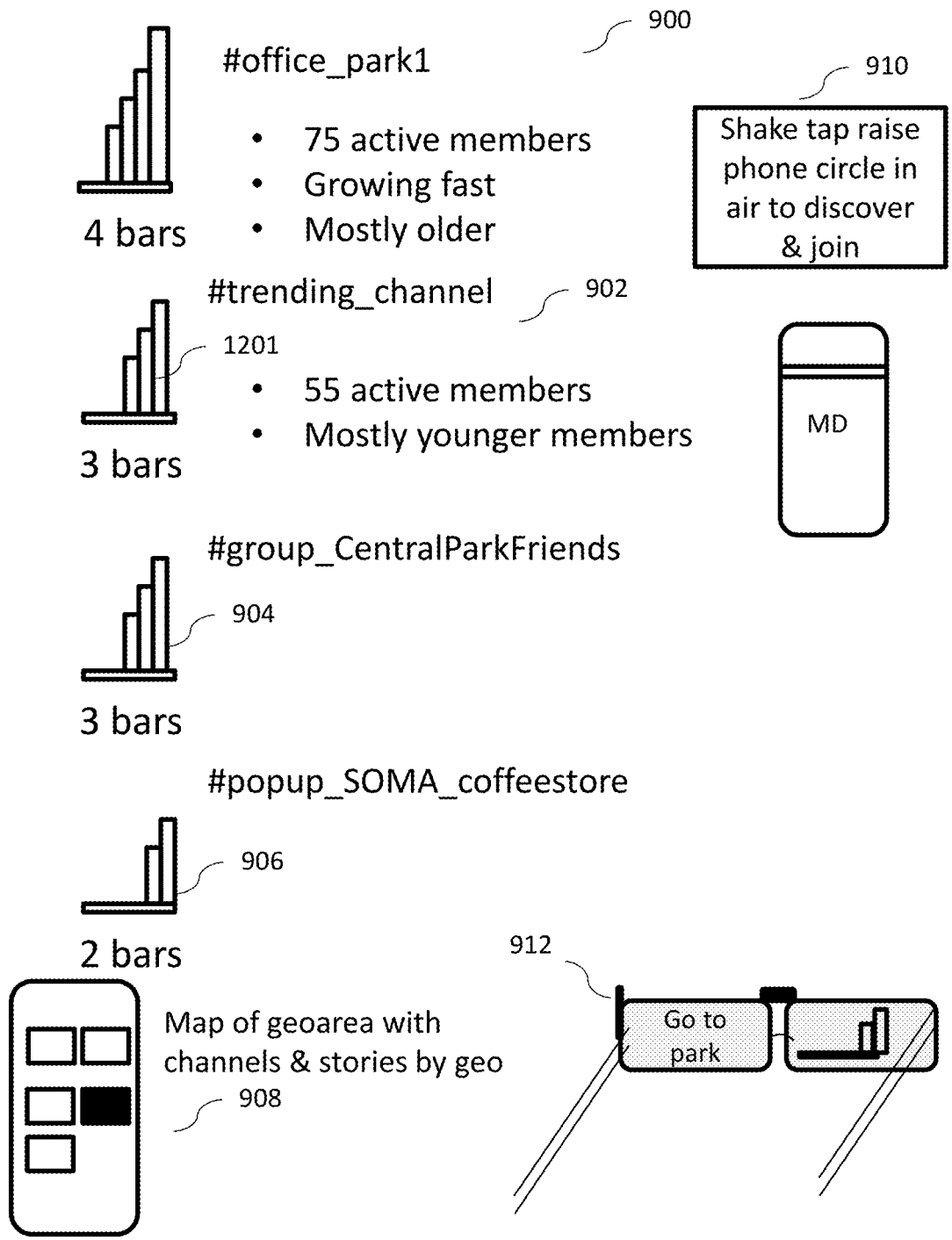
FIG. 9 depicts various friend groups and channels using visual indicators and activity and engagement indicators.

Referring now to FIG. 9, FIG. 9 depicts various channels and items that are occurring. These channels or groups may be broadcast with a signal strength 900. As an example, a signal strength of a group may present multiple bars based on the number of users in the group, the rate of messages in the group, the last activity in the group, and/or the proximity of the user to the group or channel or a story 900, 902, 904, 906. Each group or channel may have a color coded heatmap on an actual map, or a bar like interface 901. Accessing groups may be enabled by a variety of gestures including tapping on a user interface module, shaking the device, raising the device higher, double tapping on the application, depressing on the application for a time period, or fully holding the device with a pressure based touch 910. A wireless headset or augmented reality glasses 910 may further be enabled.

Once a user joins a channel, the user may tap and depress the screen to scroll through multiple pictures, videos, user profiles, and other items in the channel in a rapid fashion. Channel strength may be determined by the server or mobile device or an activity friendship and group messaging thread module. A channel strength may indicator may further be delivered as a notification to the user to indicate their activity level with sets of friends, sales contacts, or other individuals. This indication may suggest to the user to interact more on a group chat or direct message or other mechanism to improve a social connectivity score with the user.

Figure 10:
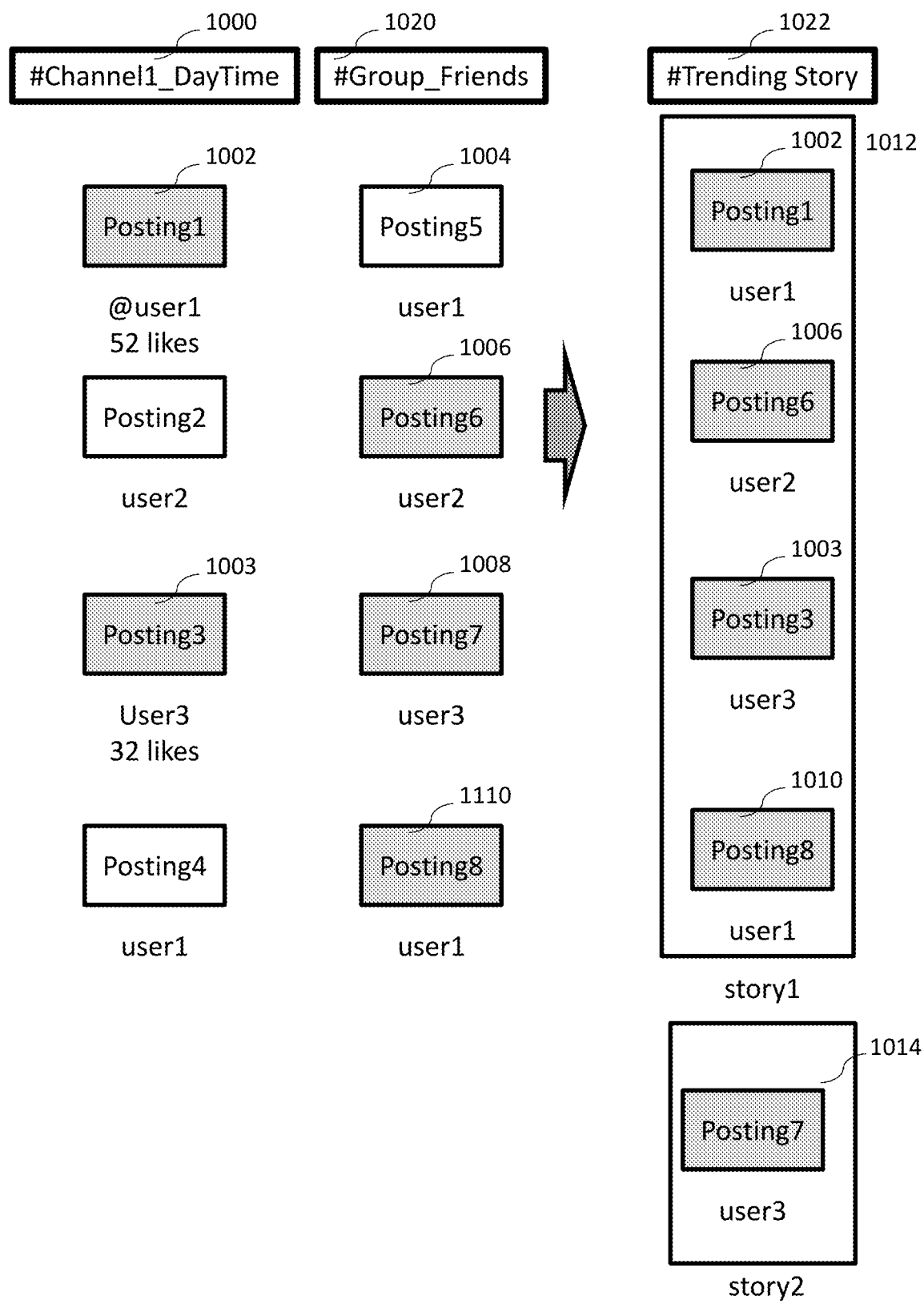
FIG. 10 depicts various postings being integrated from a first channel and a second channel into a third channel.

Referring now to FIG. 10, FIG. 10 depicts the stitching together of various content units into one overall content unit to create a channel with multiple stories 1000. In various embodiments, a system may be enabled to ingest various pictures from multiple users in one group or channel and content from a second group or channel 1020. These postings may then be assembled into a composite story and placed into a third channel or group 1022. Various text or other messages may be overlayed on top of these messages. This processing of selecting different content postings from different channels may be determined by the likes on a posting, an editorial account, a recommendation system, or an automated algorithm that looks for curated postings. These postings may be collated into a story based on time of posting, likes, location, users who posted them, high follower posters, low follower posters and other factors. These can be collated into a story1 1012 and a story 2 1014.

Figure 11:
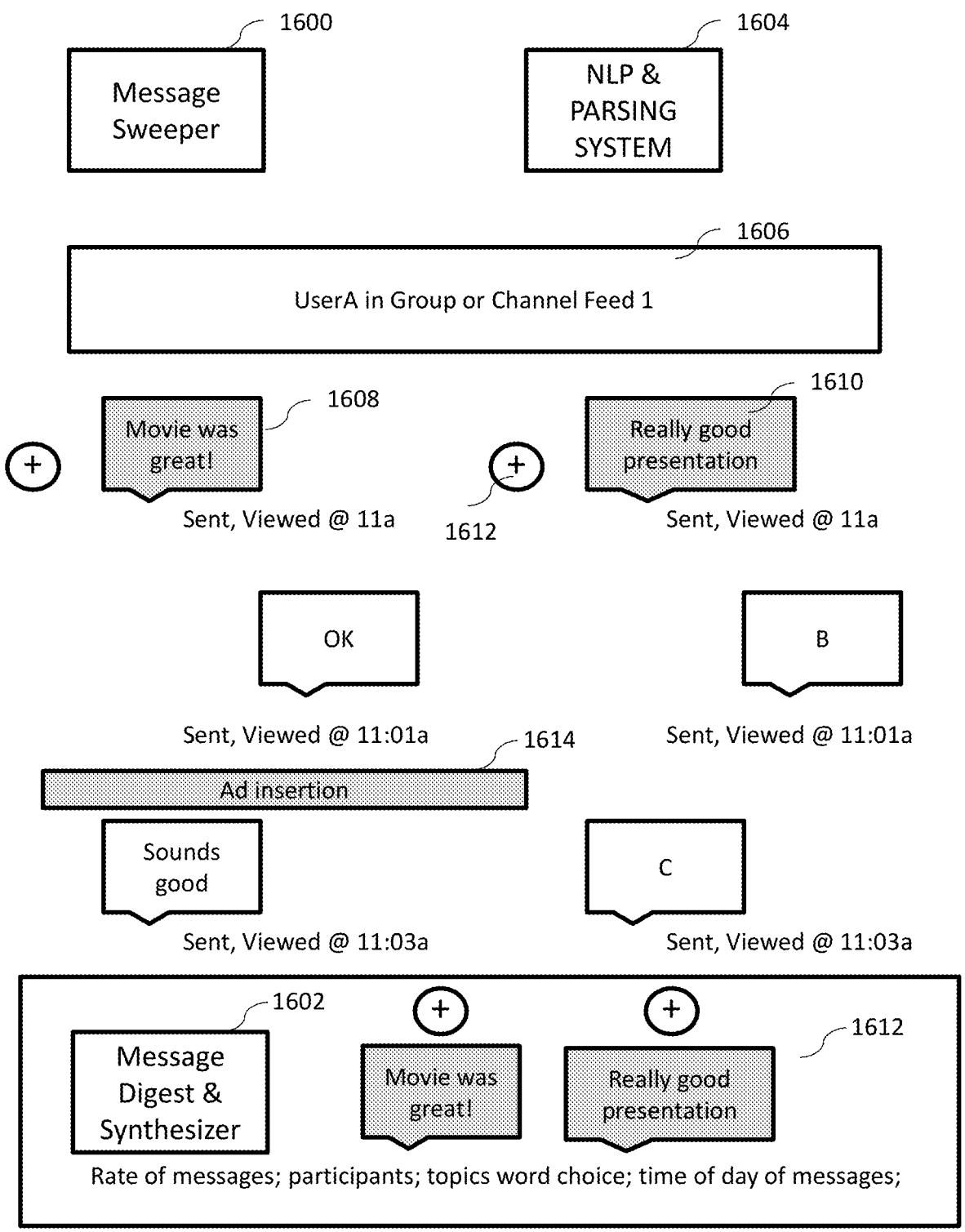
FIG. 11 depicts a message thread viewing manager which collapses group chat messages into digests for more efficient viewing.

Referring now to FIG. 11, FIG. 11 depicts various modules that may be used to add structure to message threads in a viewing state versus a responding state. In a message thread a simple flat structure may allow users to respond in line to comments. For users not actively reading the group message thread at the time, they may have a long list of messages to read with a flat hierarchy and some of the intent as to which response pertains to which original comment may be lost given the time velocity of messages; in a post-review state it may not be apparent.

It is an aspect of the disclosure to enable users to message digests to be created which are synthesized highlights of message threads, channels, and groups. A message sweeper module 1100 may remove small comments from a thread such as "OK", "Sounds good", and replace these with emoticons, icons, stickers or remove them from the thread entirely. This may enable for quicker consumptions of previous threads. The digests module 1102 may synthesize posts and messages in a thread into short content units for quick catch ups within a group chat system. The digests module may further create hierarchical structures to existing group chats. A natural language processing (NLP) and parsing module 1104 may further substitute digested comments from multiple individuals into the group chat thread converting for example, "OK" posted by userA, "Sounds good" posted by userB with users A, B, . . . N are in support. The synthesizer of these threads may learn from previous synthesis of message threads.

A viewing state of a message thread may also show plus signs (+) such as 1112 around certain thread topics. Viewing message threads with the plus sign indicator may be wrapped around messages based on an analysis of the message content by the NLP and parsing module 1104. A user may enter into a viewing state of the message thread based on toggling a button which adds a hierarchical or interest based collation of messages. The toggle can turn off these indications to recreate a flat messaging flow. A set of messages from a flat group messaging thread can be assembled into a highlighted message flow as in 1112. Ad insertion 1114 may be done into group message threads in real time or historically based on who is viewing the message thread and when the person is viewing the message thread.

The ad insertion into group chat messages may be dynamic and group and user based. In this instance, a user viewing a group chat thread may receive a first advertisement and a second user viewing the same group chat thread may receive a second advertisement. A third user viewing the thread may receive a third advertisement influenced by the click-thru rate of the first advertisement and/or the second advertisement. Additionally, the ad price may be influenced by the duration of the views of individuals within the group chat or by the likelihood to start a conversation. As an example, an ad insertion with a link to sponsored content from a brand for example may be at a higher cost per click or click-thru price based on if the subsequent conversation comes to include any comments related to the brand or product. The chat server in conjunction with an ad server and other decision logic may be enabled to analyze conversations subsequent to advertisements in addition to click-thrus of ads to determine advertising effectiveness for the campaign, users, or advertiser themselves.

In various embodiments, the platform may be implemented using hardware devices including processors, memory, compute devices, cloud, and servers. Profiles modules may be stored in memory. Decision engines may be implemented in software code and executed by processors over multiple servers and clouds. Mobile devices and wearable devices and smart glass devices may be enabled with various controllers including a haptic controller, touch screen controller, rumble controller, image controller, video capture devices, digital still picture and video recorder, microphone, and other items. The various applications may be accessible for use on a variety of devices including smart glasses, mobile devices, tablets, watches, and wearable devices. It is an aspect of the disclosure to enable window locking such that messages may appear in various locations of a mobile device.

It is an aspect of the present disclosure to enable a hashtag and channel identifier system to manage the use of uniqueness of various call outs groups and hashtags. This module manager may remove overlapping hashtags or suggest hashtags to enter into a conversation. The compliance manager may also flag hashtags that are objectionable in nature.

The foregoing description of specific embodiments of the present disclosure have been presented for purposes of illustration and description. They are not intended to be exhaustive or to limit the disclosure to the precise forms disclosed, and it should be understood that many modifications and variations are possible in light of the above teaching. The embodiments were chosen and described in order to best explain the principles of the present disclosure, and its practical application, to thereby enable others skilled in the art to best utilize the present disclosure and various embodiments, with various modifications, as are suited to the particular use contemplated. It is intended that the scope of the disclosure be defined by the Claims appended hereto and their equivalents.

What is claimed is:

1. A system comprising:
   at least one server comprising at least one processor and at least one memory, wherein the at least one server is configured to receive one or more content units including at least one image from a mobile application associated to a user account;
   the at least one server configured to assemble a post in a story format based at least on the one or more content units organized into a sequence and an overlay text associated with at least one of the one or more of content units;
   wherein the post is associated to a location and a geofenced area; and
   the at least one server configured to provide the post with a supplemental content in the sequence or on top of at least one image of the post to a separate mobile application associated with a separate location within the geofenced area.

2. The system of claim 1, wherein the post is enabled to be viewable, based on a permission setting and for a set time period, by the separate mobile application associated to a separate user account.

3. The system of claim 1, wherein the post is recommended to be viewed by the separate user of the separate mobile application based on one or more criteria.

4. The system of claim 3, wherein the one or more criteria comprises of a location associated with the post and the separate location of the separate mobile application provided to the at least one server.

5. The system of claim 1, wherein the supplemental content comprises of one or more of news articles, videos, and advertisements.

6. The system of claim 5, wherein a channel made accessible by the at least one server to the mobile application comprises of the post and one or more separate stories created by one or more separate users.

7. The system of claim 6, wherein the channel comprises of at least one of the one or more content units and a second content unit of the one or more separate users aggregated into a story format.

8. The system of claim 1, wherein the post is accessible on a first social network and a second social network.

9. The system of claim 1, wherein a channel is accessible to a user via the user's mobile application based on the user completing an authentication task associated to the channel.

10. The system of claim 1, wherein a channel associated to an interest, a location, users, and/or a group is made accessible by the at least one server and is comprised of the post and one or more posts from the separate mobile application.

11. The system of claim 10, wherein the channel is made accessible by server to the separate mobile application only upon the separate mobile application being utilized within an area associated with the channel.

12. A system comprising:
    a server comprising at least one processor and at least one memory;
    a mobile application stored as a non-transitory computer readable medium, wherein the mobile application is configured to be executed by a processor of a mobile device;
    wherein the server is configured to receive one or more content units associated to a user account from the mobile application;
    the server configured to provide access to a second mobile application, executed by a processor of a second mobile device, to a version of the one or more content, units organized into a sequence and with an overlay text associated with at least one of the one or more of content in a channel; and
    wherein the channel is accessible by the second mobile application responsive to the second mobile device being located within a geofenced area associated with the channel.

13. The system of claim 12, wherein the one or more content units and the overlay text are organized into a story.

14. The system of claim 13, wherein the channel is associated to an interest, a location, users, and/or a group and comprises of the one or more content units and one or more posts from at least one separate user.

15. The system of claim 14, wherein the channel is accessible based on a configurable permission setting.

* * * * *